July 10, 1956
D. H. ELWOOD
2,754,439
APPARATUS FOR IMPARTING OSCILLATORY MOVEMENT
TO A SHAFT FROM A REMOTE OSCILLATORY SHAFT
Filed Jan. 20, 1955
2 Sheets-Sheet 2
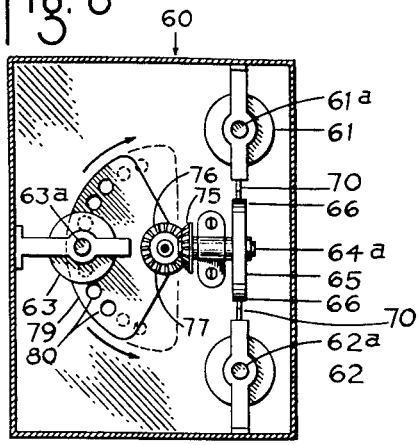
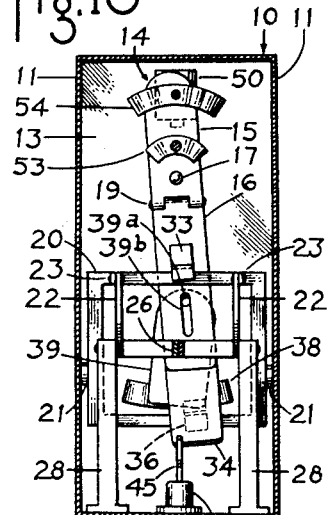
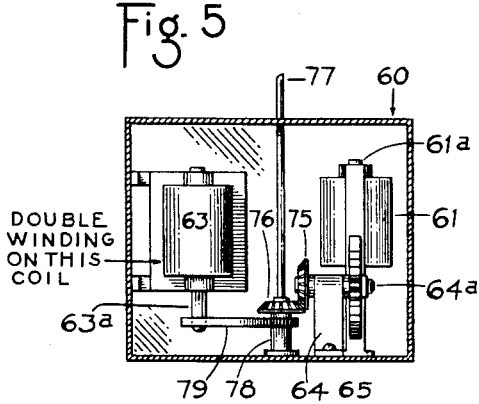
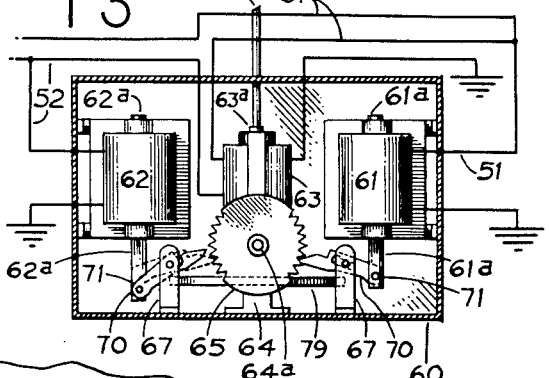
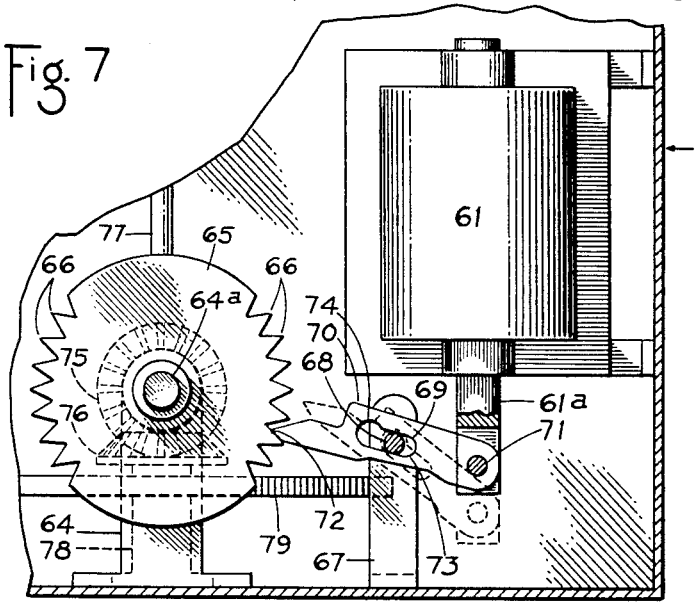
DANIEL H. ELWOOD
INVENTOR.
BY
ATTORNEY

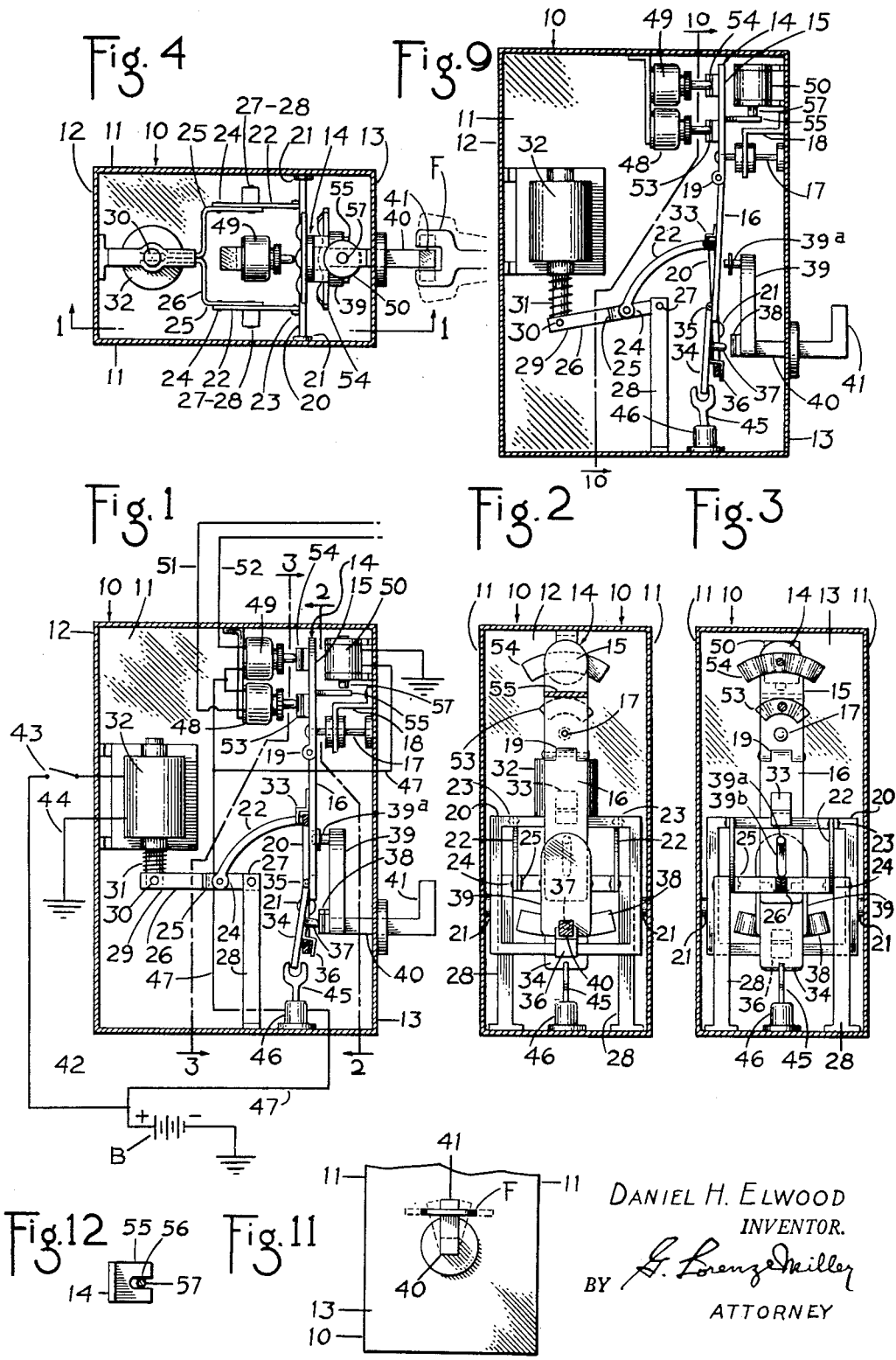

United States Patent Office 2,754,439
Patented July 10, 1956

2,754,439

APPARATUS FOR IMPARTING OSCILLATORY MOVEMENT TO A SHAFT FROM A REMOTE OSCILLATORY SHAFT

Daniel H. Elwood, Decatur, Ill.

Application January 20, 1955, Serial No. 483,006

11 Claims. (Cl. 310—120)

This invention relates to apparatus for imparting oscillatory movement to a shaft from a remote oscillatory shaft.

While the invention is applicable to the importation of oscillatory movement to a shaft for various purposes, it is particularly adapted for use with motor vehicle headlights wherein a headlight supporting shaft is oscillated or rotated in opposite directions and through various angles from the steering shaft of a motor vehicle whereby the headlights are turned to the left or to the right in synchronism with corresponding movements of the steering shaft.

A primary object of the invention is the provision of primary and secondary control assemblies in electrical connection with each other and with a common battery and wherein a first shaft oppositely rotatable about its axis is operatively engaged with the first assembly and wherein a second shaft oppositely rotatable about its axis is operatively engaged with the second assembly, and wherein rotational movement of the first shaft intermittently actuates switches in the first assembly with resulting electrical impulses which are conducted to the second assembly and therein operate solenoids which in turn actuate mechanical means for imparting opposite rotation to the second shaft concurrent with that of the first shaft.

A further object of the invention is the provision of means in the second assembly for retaining the second shaft in any angularly rotated position.

A still further object of the invention is the provision of means for rendering the first assembly inoperative when electric connection thereof to the battery is broken.

Other objects and advantages of the invention will become apparent in the course of the following detailed description, taken in connection with the accompanying drawings, wherein—

Fig. 1 is a vertical sectional view in the plane of line 1—1 on Fig. 4 showing the primary control box in section and the mechanism housed therein in elevation.

Fig. 2 is a vertical sectional view as observed in the planes of broken line 2—2 on Fig. 1.

Fig. 3 is a vertical sectional view as observed in the planes of broken line 3—3 on Fig. 1.

Fig. 4 is a top plan view of the mechanism of Fig. 1 with the upper end of the housing cut away and in section.

Fig. 5 is an end elevational view of the secondary control box with the end of the housing cut away and in section, one of the solenoids being omitted for the sake of better clarity of illustration.

Fig. 6 is a side elevational view of the structure of Fig. 5 with one side of the housing broken away and in section.

Fig. 7 is an enlarged fragmental detail view of part of the right hand end of Fig. 6 with certain parts in vertical section.

Fig. 8 is a top plan view of the structure of Figs. 5 and 6 with the housing broken away and in section.

Fig. 9 is a view similar to Fig. 1 but showing the control mechanism in de-energized or inoperative position.

Fig. 10 is a view similar to Fig. 3 but showing the mechanism in a position for turning a headlight in one direction, and the figure being a vertical section in the planes of broken line 10—10 on Fig. 9.

Fig. 11 is a detail elevational view of the right hand end of Fig. 1

Fig. 12 is a top plan view of an oscillating arm involved in the structure together with a locking solenoid armature engaged therewith.

Referring now in detail to the drawings, and first to Figs. 1 to 4 and 9 to 12 thereof in which is illustrated the primary control assembly, 10 designates a housing which is conveniently of rectangular form and which comprises opposite side walls 11 and end walls 12 and 13.

An arm 14 extends generally vertically within the housing 10 and includes an upper section 15 and a lower section 16.

The upper section 15 adjacent the lower end thereof is pivotally supported on a pivot member 17 for oscillating movement toward and from the side walls 11 and parallel with the end walls 12 and 13 and the pivot member 17 is rigidly supported by the end wall 13 by means of a suitable bracket 18.

The upper end of the lower arm section 16 is hingedly connected to the lower end of the upper section 15, as indicated at 19, for movement of the lower section relative to the upper section in directions parallel to the side walls 11 and at right angles to the direction of movement of the upper section 15.

A generally vertically disposed rectangular frame 20 is disposed adjacent the lower arm section 16 and the opposite sides of the frame are pivotally connected by bearings 21 in the side walls 11.

A pair of curved arms 22 have adjacent ends thereof pivotally secured to the upper horizontal portion of frame 20 as indicated at 23 and the opposite adjacent ends of the arms are pivotally connected at 24 to the opposite portions 25 of a forked lever 26 and which portions 25 are pivotally connected at 27 to the upper ends of laterally spaced vertical supports 28.

The stem portion 29 of the forked lever is pivotally connected at 30 to the armature 31 of a solenoid 32 whereby upon energization of the solenoid, the armature 31 is raised, as indicated in Fig. 1, with a resulting movement of the frame 20 to its vertical operative position.

The lower end of the lower arm section 16 is provided with a clip member 33 which loosely embraces the upper horizontal portion of the frame 20 whereby the portion 16 is movable with the frame while the arm 14 is movable on pivot 17 independent of the frame.

A vertically elongated throwout member 34 has its upper end pivotally connectecd to the lower arm portion 16, as at 35, and the lower end of member 34 is provided with a clip member 36 which loosely engages the lower horizontal portion of the frame 20.

The throwout member 34 is also provided with a follower pin 37 engageable with an arcuate cam member 38 supported by the lower end of a rocker member 39 which is secured to a shaft 40 rotatably supported in the end wall 13 and which is provided with a vertical portion 41 for a purpose later to appear. The rocker member 39 is provided with a pin 39ª engageable within a vertically disposed slot 39ᵇ in the lower section 16 of arm 14 for a purpose later to appear.

The above described solenoid 32 is in circuit connection with a battery B which may be the regular automobile battery, through a wire 42 provided with a switch 43 and a ground wire 44.

The lower end of the throwout member 34 is engageable within a fork-like member 45 of a toggle switch 46 which controls the circuit of wire 47 from the battery B to the switches 48 and 49, as well as to a solenoid 50. The switches 48, 49 and solenoid 50 are disposed adjacent the upper end of housing 10 and are respectively secured to the top wall of the housing and the end wall 13.

Furthermore, the switches 48, 49 are disposed on one side of the arm 14 while the solenoid 50 is disposed on the opposite side thereof. The switches 48 and 49 control current flow through wires 51 and 52 respectively, which extend to a second control assembly about to be described.

The switches 48 and 49 are controlled by arcuate cam members 53 and 54 respectively on the upper arm section 15 upon oscillation of the arm on the pivot 17. The cam members 53 and 54 in common with cam member 38 are provided with corrugated faces for a purpose later to appear.

The arm 14 is provided with a lateral portion 55 which is provided with an open ended slot 56 in which is engageable the armature 57 of the solenoid 50 for a purpose later to appear.

The second control assembly, as illustrated in Figs. 5 to 8, comprises a housing 60. Supported within the housing 60 adjacent one wall thereof are a pair of solenoids 61 and 62 having armatures 61$^a$ and 62$^a$ and a third solenoid 63 having an armature 63$^a$ is disposed adjacen an opposing wall and said solenoids are intermittently actuated by current supplied through the wires 51 and 52 by the intermittently operated switches 48 and 49.

Rotatably mounted in a bracket 64 supported on the lower wall of housing 60 is a horizontal shaft 64$^a$ whose is normal to the plane of the axes of solenoids 61 and 62 and is in a plane containing the axis of solenoid 63. Secured to the shaft 64$^a$ is a ratchet disc 65 having a series of teeth 66 on each side thereof.

A post 67 is vertically supported by the bottom wall of the housing between the ratchet disc 65 and each of the solenoids 61 and 62 and each post is provided with a laterally projecting pin 68 which projects into a slot 69 in a dog 70 whose one end is pivoted to the armatures 61$^a$, 62$^a$ of the respective solenoids 61, 62 by a pin 71.

The opposite ends of the dogs each have a point 72 engageable with the teeth 66.

The slots 69 each include a narrow end portion 73 and an opposite enlarged rounded portion 74 for a purpose later to appear.

On the inner end of shaft 64$^a$ is a bevel gear 75 in mesh with a bevel gear 76 rigid with a shaft 77 on which a headlight may be suitably mounted and which shaft is rotatably supported in a bearing post 78.

A sector plate 79 is suitably connected to gear 76 and shaft 77 for rotation therewith and said plate is provided with a series of apeprtures 80 disposed in an arc concentric with the axis of shaft 77 and into which holes the armature 63$^a$ of solenoid 63 is successively extended in a manner later described.

Having set forth the structure entering into the invention, the operation thereof is as follows:

It is first to be observed that the first or primary control assembly of Figs. 1 to 4 and 9 to 12 is inoperative when the switch 43 is open, as indicated in Fig. 1, and under which circumstances the frame 20 is in the inwardly inclined popsition shown in Fig. 9, wherein the cam member 38 is out of contact with the pin 37 and the pin 39$^a$ is withdrawn from the slot 39$^b$ in the lower section 16 of arm 14, and also the throwout member 34 has actuated the toggle switch 46 thereby interrupting the circuit through wire 47 to the switches 48 and 49.

Upon closing the switch 43, however, the frame 20 is moved to a substantialy vertical position as indicated in Fig. 1 with a resulting engagement of cam member 38 with the pin 37 on the throwout member 34 and also the pin 39$^a$ on rocker member 39 has entered the slot 39$^b$ in the arm 14.

The steering shaft or other oscillatory shaft is provided with a fork F, as indicated in Fig. 4, and which fork embraces the vertical portion 41 of shaft 40 and upon right or left rotation of the steering shaft the fork F is moved to one or the other dotted positions thereof, as indicated in Fig. 4, with a resulting rotation of shaft 40 to the right or left corresponding to the rotations of the steering shaft.

Such movements of shaft 40 impart right or left swinging movement to the rocker member 39 and concurrent therewith, the corrugated cam 38 in engagement with pin 37 moves the lower end of the throwout member which engages the fork 45 of the toggle switch 46 with a resulting on-and-off actuation of the switch with a resulting intermittent supply of current to the switches 48 and 49 through the wire 47.

Furthermore, movement of rocker member 39 effects the movement of the arm 14 about its pivot 17 with a resulting on-and-off actuation of switch 48 or switch 49, depending upon the direction of rotation of arm 14 about its pivot 17.

It is to be observed at this point that switches 48 and 49 are one way operative so that switch 48 is actuated by cam 53 upon one direction of movement of arm 14 while switch 49 is actuated by cam 54 upon the other direction of movement of the arm 14.

The switches in open position cause current to flow through wires 51 and 52 to the second control assembly as above described.

Let it be assumed that the steering shaft is turned to the left, with a resulting swinging of arm 14 to the left and an intermittent actuation of switch 48, which actuates the solenoid 61 through the wire 51. Such action lifts the armature 61$^a$ from the "down" dotted position to the "up" solid line position, and which action causes lifting of the dog 70 with a resulting one tooth step of the ratchet disc 65 to the right with a corresponding movement of the shaft 77.

Upon turning the steering shaft to the right, the solenoid 62 will be activated and the dog 70 operated thereby will move the ratchet disc 65 to the left with a right hand step rotation of shaft 77.

Upon the step rotation of shaft 77 in either direction the sector plate 79 is moved therewith and the armature 63$^a$ in its down movements is adapted to engage successively the holes 80 in the plate, which down movements occur during the inactive periods of the dogs 70. This engagement of the plate 79 by the armature 63$^a$ holds shaft 77 in its angular position until shaft 40 is again rotated.

When the current is interrupted to the switches 48 and 49, the armature 57 of solenoid 50 drops into the slot 56 and holds the arm 14 against rotation on pivot 17.

Having set forth my invention in accordance with a preferred structural embodiment thereof, what I claim and desire to secure by U. S. Letters Patent is:

1. In a device of the class described and for the purpose set forth, a housing, an operated shaft supported in said housing for rotation in opposite directions, a pair of solenoids, means operable by said solenoids for rotating said shaft in opposite directions, a second housing, a pair of switches in said second housing, each controlling an electric circuit to a respective one of said solenoids, an arm swingably mounted on a pivot supported by said second housing, individual cam means on said arm for operation of one of said switches upon swinging movement of said arm in one direction and for operation of the other of said switches upon swinging movement of the arm in the opposite direction, and an operating shaft rotatably supported in said second housing for rotation in opposite directions, and a connection between said operating shaft and said arm, for operating selectively either of the solenoid switches.

2. The structure according to claim 1, wherein said means operable by said solenoids comprises a ratchet wheel, a ratchet wheel actuating dog disposed at each side of said ratchet wheel, said dogs being operable by the armatures of said solenoids and a drive connection between said ratchet wheel and said operated shaft.

3. The structure according to claim 2, wherein said drive connection between said ratchet wheel and said operated shaft comprises a bevel gear rigid with said ratchet wheel in driving engagement with a bevel gear rigid with said operated shaft.

4. The structure according to claim 2, together with a sector plate swingable about a pivot by said drive connection for the operated shaft, said plate being provided with a series of apertures disposed in an arc concentric with said pivot, and a third solenoid whose armature intermittently enters said apertures for temporarily retaining said plate and said operated shaft against rotation.

5. The structure according to claim 1, wherein said switches are operable in opposite directions, and wherein said arm is provided with a pair of corrugated cams, one of which intermittently operates one of said switches upon movement of said arm in one direction and the other of which intermittently operates the other of said switches upon movement of said arm in an opposite direction.

6. The structure according to claim 5, wherein said arm is swingably supported on a pivot below said switches, and said cams being of arcuate formation concentric with said pivot.

7. The structure according to claim 1, wherein said arm comprises an upper section swingable on said pivot, and a lower section whose upper end has a hinge connection with the lower end of the upper section on an axis perpendicular to said pivot, a rectangular frame disposed adjacent the lower end of said lower section and having a loose connection therewith, said frame being pivotally connected to opposite walls of said second housing, a toggle switch controlling flow of current from a battery to said first switches, a vertically elongated throwout member whose upper end is pivotally connected to the lower end of said arm lower section and whose lower end is operatively engaged with said toggle switch, said throwout member having a loose connection with said frame and electrically operated means for swinging said frame about its pivot from a normal inoperative inclined position to an operative vertical position.

8. The structure according to claim 7, wherein said means for swinging said frame comprises a solenoid, a forked lever operably engaged with the armature of said last solenoid, corresponding ends of said forked lever being pivotally connected to vertical supports, and a pair of arms having corresponding ends thereof pivotally connected to said forked lever and the other ends thereof pivotally connected to the upper horizontal member of said frame.

9. The structure according to claim 7, wherein said loose connections respectively comprise a clip member on the lower arm section engaged over the upper horizontal portion of said frame, and a clip member on said throwout member engaged over the lower horizontal portion of said frame.

10. The structure according to claim 7, wherein said arm lower section is provided with a vertical slot and wherein said throwout member is provided with a pin, and a rocker member operable by said operating shaft and having a pin engageable within said slot and an arcuate corrugated cam engageable with said first pin for oscillation of said throwout member.

11. The structure according to claim 7, together with electrically operated means for retaining said arm in its inoperative position.

References Cited in the file of this patent

UNITED STATES PATENTS

| | | |
|---|---|---|
| 2,092,298 | Bauer | Sept. 7, 1937 |
| 2,473,907 | Ridgely | June 21, 1949 |